Dec. 8, 1936.  W. B. SHAW  2,063,055
WINDSHIELD WIPER
Filed Jan. 2, 1932   3 Sheets-Sheet 1
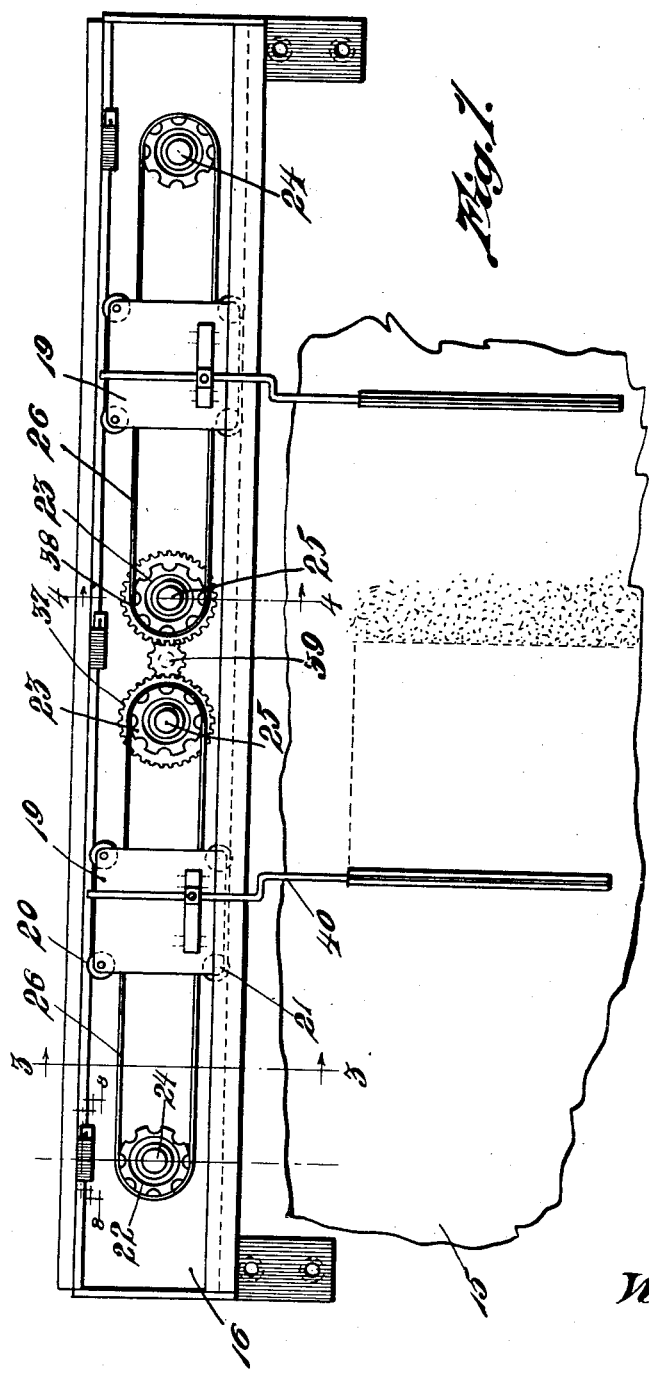
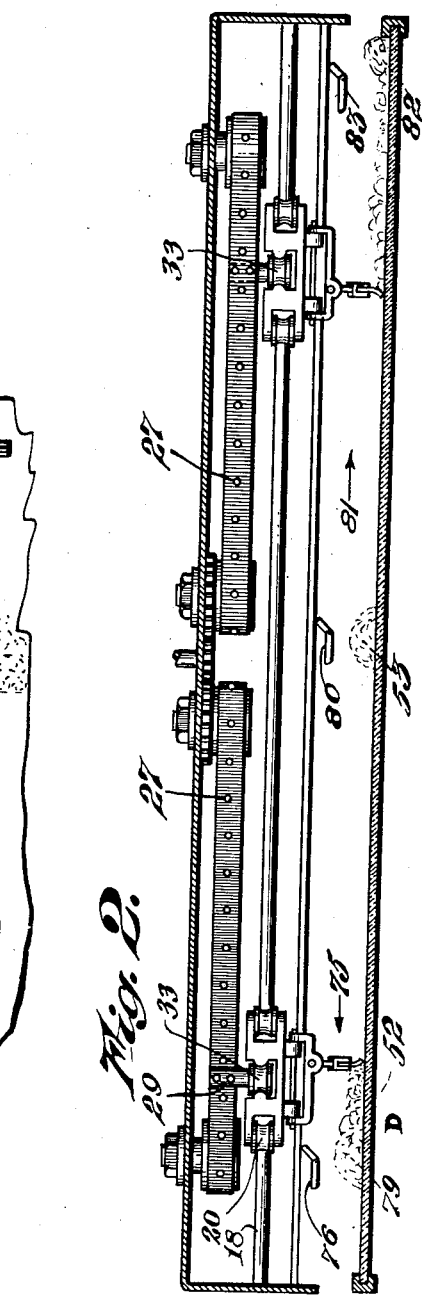
INVENTOR.
William B. Shaw
BY Barlow & Barlow
ATTORNEYS.

Dec. 8, 1936.  W. B. SHAW  2,063,055
WINDSHIELD WIPER
Filed Jan. 2, 1932  3 Sheets-Sheet 2
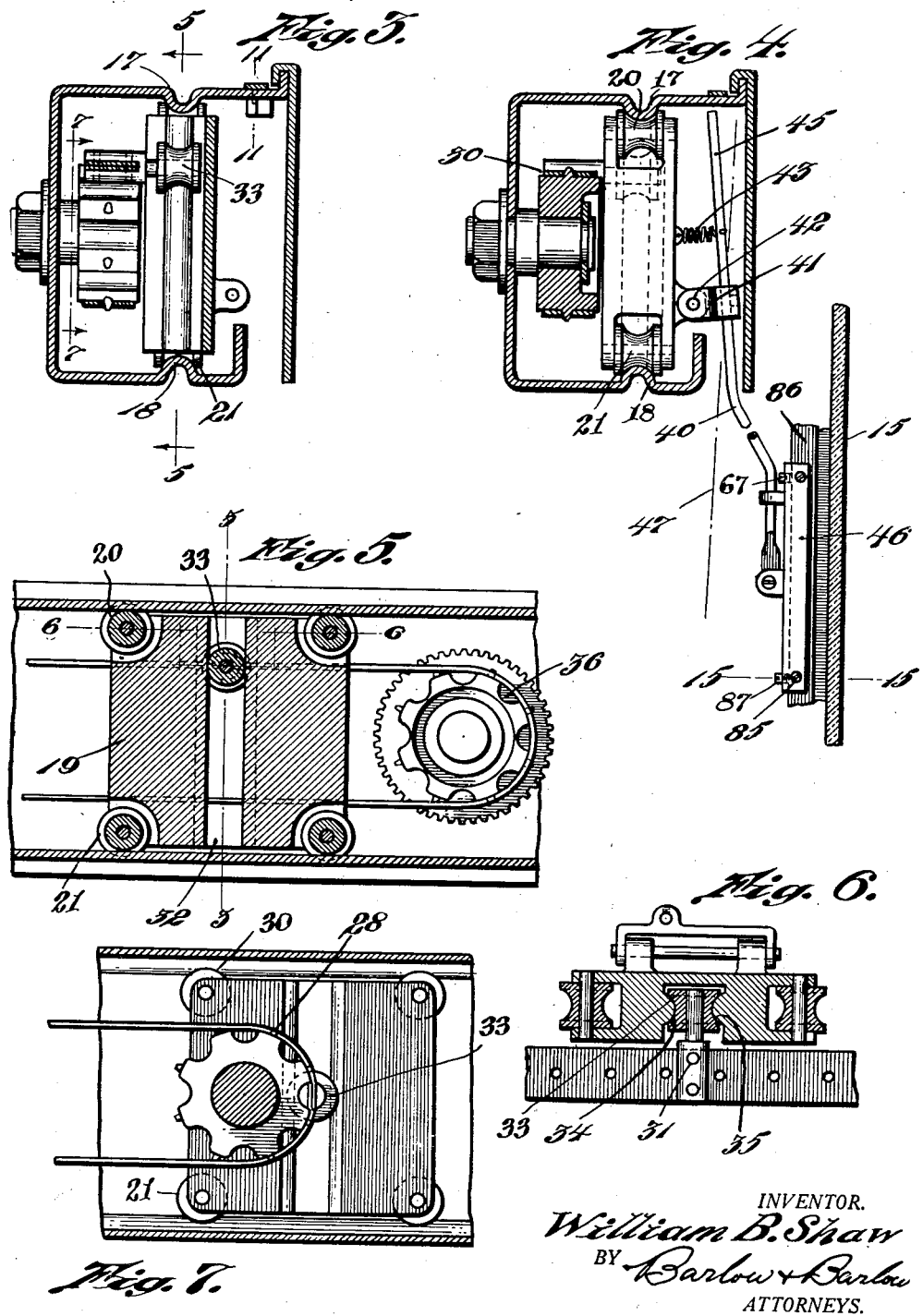
INVENTOR.
William B. Shaw
BY Barlow + Barlow
ATTORNEYS.

Dec. 8, 1936.                W. B. SHAW                2,063,055
                           WINDSHIELD WIPER
                         Filed Jan. 2, 1932         3 Sheets-Sheet 3
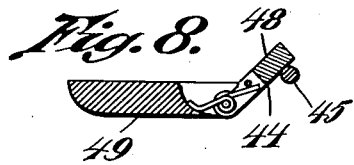
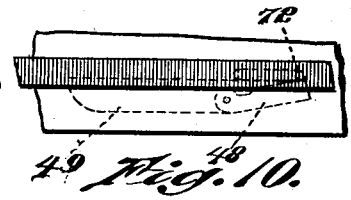
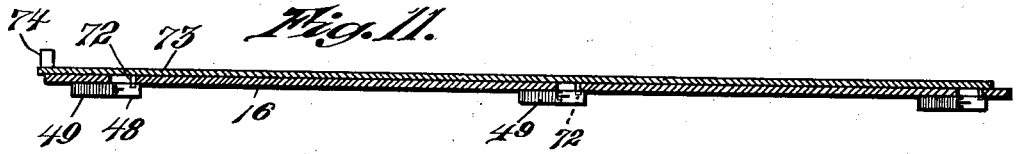
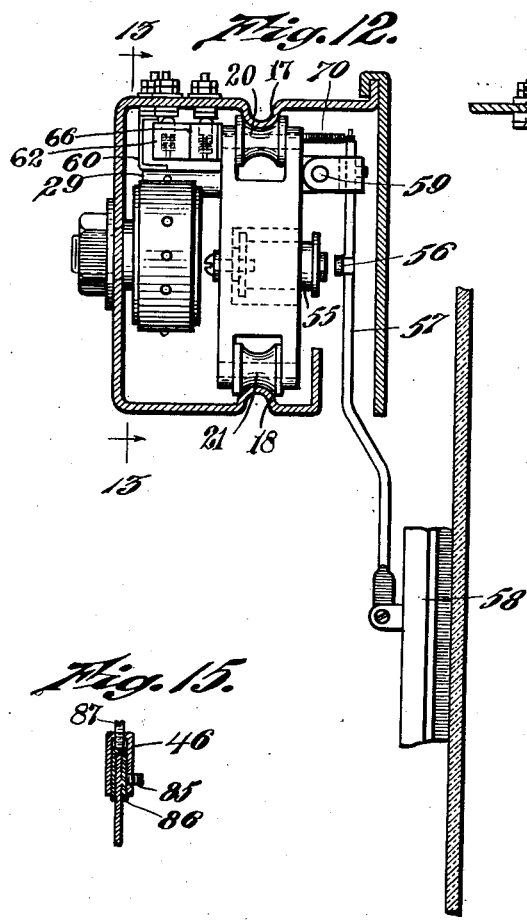
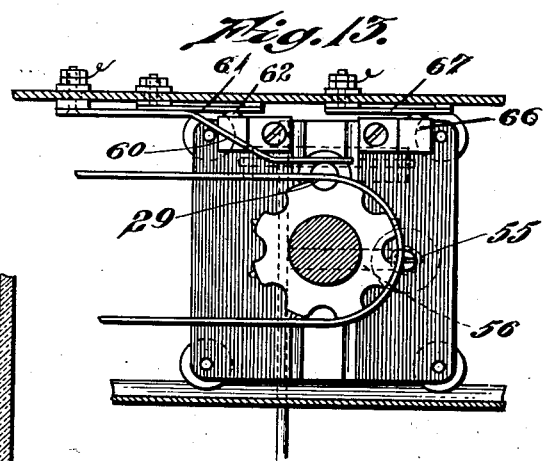
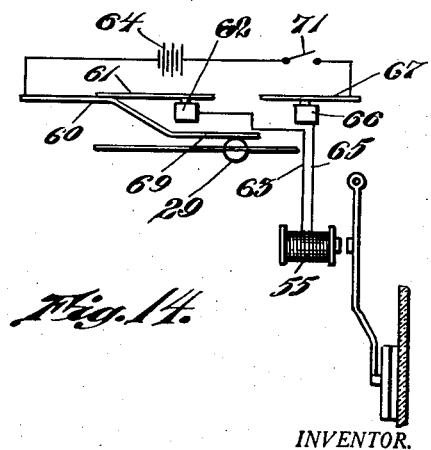
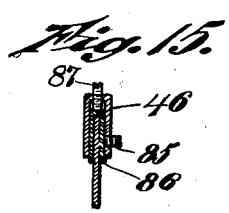
INVENTOR.
William B. Shaw.
BY Barbour & Barbour
ATTORNEYS.

Patented Dec. 8, 1936

2,063,055

UNITED STATES PATENT OFFICE 2,063,055

WINDSHIELD WIPER

William B. Shaw, Providence, R. I.

Application January 2, 1932, Serial No. 584,401

16 Claims. (Cl. 15—253)

This invention relates to a window cleaner of the type generally known as a windshield wiper and particularly adapted for use for clearing away the accumulation on the windshield of a motor vehicle.

An object of this invention is to provide a window cleaner which will remove snow accumulated on the windshield of a motor vehicle therefrom.

Another object of this invention is the provision of a construction which will remove snow from the windshield of a motor vehicle by moving the same therefrom in one direction.

Another object of this invention is the provision of a construction having reciprocating movement over the surface of the windshield in which the wiper blade will step over an accumulation of snow adjacent one end of its travel to pick up the pile and move it in the opposite direction or optionally to operate in continuous contact with the surface of the windshield.

Another object of this invention is the provision of a pair of wiper blades which will cooperate to remove snow or the like along the windshield, with one of the wiper blades operating a portion of the distance and then the other of the wiper blades picking up this portion of snow accumulated by the first wiper blade to carry it the remainder of the distance across the windshield that the entire width of the windshield may be cleaned without accumulation in the center.

Another object of this invention is to move and optionally lift a pair of windshield wiper blades from the window surface in the proper timed relation to pick up snow and move it across the windshield and discharge it at the desired edge thereof.

A further object of this invention is the provision of a traveling belt for moving a carriage carrying the wiper blade with means to manipulate the wiper blade with reference to the carriage.

A still further object of the invention is to provide an adjustable clamp to accommodate the wiper blade.

With these and other objects in view, the invention consists of certain novel features of construction, as will be more fully described, and particularly pointed out in the appended claims.

In the accompanying drawings:

Fig. 1 is a face view of a fragmental portion of a windshield and the operating mechanism for a pair of wiper blades with parts removed to expose the same to view.

Fig. 2 is a sectional view through a windshield and the housing for the wiper blades mechanism, illustrating the operating mechanism therein.

Fig. 3 is a sectional view through the carriage and housing on line 3—3 of Fig. 1.

Fig. 4 is a sectional view similar to Fig. 3, on line 4—4 of Fig. 1, showing the wiper blade in position and illustrating an abutment or cam for removing the wiper blade from contacting position on the windshield.

Fig. 5 is a section on line 5—5 of Fig. 3.

Fig. 6 is a section on line 6—6 of Fig. 5.

Fig. 7 is a partial section on line 7—7 of Fig. 3 of a detail showing the carriage at the end of its stroke about the traveling belt.

Figs. 8 and 9 are detailed views of the cam in its different positions during the movement of the wiper blade.

Fig. 10 is a fragmental view looking at the top of the housing and showing the cam moved to inoperative position.

Fig. 11 is a sectional view of a fragmental portion of the housing on substantially line 11—11 of Fig. 3.

Fig. 12 is a sectional view showing the modified form of construction for removing the wiper blade from position against the window.

Fig. 13 is a section on line 13—13 of Fig. 12, showing the contacts for closing the support in the construction.

Fig. 14 is a diagrammatic view illustrating the wiring connections and support for operation of the wiper in use.

Fig. 15 is a section on line 15—15 of Fig. 4.

It is frequently experienced during the travel of a motor vehicle through a snow storm that snow will accumulate on the windshield and the regular reciprocating motion of a wiper blade or windshield cleaner will, after a time, pile up show at either end of its stroke and then spring outwardly and slip over the accumulation or jam and fail to function, and in order to avoid this undesirable result I have provided for a movement of the wiper blade whereby it will step over the snow or the like at one end of its stroke and pick up the accumulated pile and move it in the opposite direction, and in order to accomplished this cleaning effect I have provided two wiper blades, one to move a portion of the width of the window to be cleaned and a second wiper blade to pick up the snow at the end of the travel of the first wiper blade and continue it across the window and discharge it to prevent obstruction of the vision of the driver; and the following is a detailed description of the present embodiment of this invention illustrating the preferred means by which these advantageous results may be accomplished.

With reference to the drawings, 15 designates the windshield or window of a motor vehicle along the upper edge of which I have suitably supported a casing 16 formed of pressed metal with inwardly extending deflection of the stock 17 at its top and 18 at its bottom to provide a track for reciprocally mounting a pair of carriages 19 therein. Each carriage is operated by generally the same mechanism and for purposes of description I will refer to one.

Each carriage is provided with grooved rollers designated 20 at its upper edge and 21 at its lower edge for engagement with tracks 17 and 18 to be guided in its reciprocating movement therealong. A set of pulleys 22 and 23 are suitably mounted on bearings 24 and 25 in the casing about which a belt 26 is trained, which belt is provided with openings 27 to receive pins 28 on the pulley that the belt may be positively driven thereby and prevented from slipping therealong. The ends of the belt are secured together by a pin 29 which is slotted as at 30 to receive the overlapping edges of the belt, while rivets 31 pass through the pin and the belt to bind the parts together. In passing over the pulleys the pin 29 is received in suitable recesses therein. The pin 29 extends into the slot 32 in the carriage 19 and is provided with an anti-friction roll 33 which is concaved as at 34 to receive the projecting portions 35 forming a guide for its movement along the slot 32, thus the carriage will be moved in opposite directions along the housing by traveling of the belt 26 about the pulleys.

Two of the constructions above described operate each in one half of the housing to cover one portion of the window and to cooperate to clean the entire width of the window, and in order that these belts will be driven in synchronous relation I have mounted gears 37 and 38 on the adjacent pulleys of the belts and drive these by spur gear 39 which is operated by any suitable source of power such as an electric motor, vacuum motor or other common well-known type power supply.

A wiper arm 40 is hingedly mounted on each of the carriages 19 by means of a rocking member 41 pivoted on the ear 42 and provided with a clamp member 46 carried by the arm. The clamp member 46 is of channel construction with set screw 85 threaded through its opposite side walls to engage the wiper blade 86 which may be inserted and clamped therein while the vertical alignment of the blade 86 may be governed by set screws 87 engaging the back thereof to cause the edge to contact with the window throughout its length. The blade is held in engagement with the window 15 by means of a spring 43 acting between the arm and the carriage to resiliently urge the blade toward the windshield.

At certain points in the travel of the wiper blade, it is desired to swing the blade from the windshield which I have accomplished by providing a cam surface 44 formed of two parts and in the path of travel of the upper end 45 of the wiper arm 40 so that when this upper end strikes this surface it will swing the arm against the action of the spring 43 to the dotted line position 47 shown in Fig. 4 away from the surface of the window. The two parts of the cam surface 44 comprise a fixed part 49 and a movable part 48 pivoted thereto and urged into the position illustrated in Fig. 8 by a spring 51. The path of travel of the wiper arm will be along the movable portion 48, shown in Fig. 8, thence along the relatively fixed portion 49 and will return along the surface 50 to swing forwardly the movable portion 48 of the cam against the action of the resilient spring 51 to allow the blade to travel in its return movement along the window, and by this arrangement I may cause the wiper blade to step over an accumulation of snow as illustrated at 52 or 53 to engage the window on the opposite side thereof and move the snow or the like in the desired direction of travel, to discharge it at the desired edge of the windshield. When it is desired that the wiper blade operate in the usual manner having continuous engagement with the window or windshield, I move the portion 48 against the action of its spring to align it with the fixed portion 49 which is accomplished by pins 72 secured to a bar 73 and extending through slots in the top of the housing 16. The bar may be moved to operate the movable portion of the cam by a handle 74 adjacent one end thereof or by any other desired means.

The above illustrates the mechanical means by which this invention may be carried out, but in some cases I may provide an electrical means for accomplishing this result, as shown in Figs. 12 to 14 in which I have mounted an electromagnet 55 on the carriage and have provided an armature 56 on the arm 57 of the wiper blade 58, which arm is pivoted on the ear 59 at the upper edge of the carriage. The electric circuit is formed by means of a resilient arm 60 which is raised by pin 29 to cause engagement of this arm 60 with the contact strip 61 with which the brush 62 carried by the carriage also engages, which completes one line 63 from the battery 64 to the electromagnet 55, while the return is by means of line 65, the brush 66 and similar contact blade 67 to the source of power 64, thus causing the wiper to be drawn toward the electromagnet and away from the glass during the movement of the contact pin 29 along the surface 69 of the arm 60 and after this length of travel the circuit will then be broken and the arm will be permitted to be returned to the surface of the glass by resillient means 70 to engage a pile of snow and move it in the desired direction of travel. The removal of the wiper blade from the window may be suspended by breaking the circuit by a suitable switch 71.

With particular reference to the showing in Fig. 2, the driver of the vehicle would be assumed to be located at D and when it is desired to have the device operate for the removal of snow from the windshield the bar 73 would be moved by means of the handle 74 to cause the pins 72 to move from behind the movable portion 48 of the cam surface to permit the spring to move this portion into operating position, as illustrated in Figs. 2 and 11, and when in this position the wiper blade in front of the driver will move along the outer surface of the windshield in the direction of the arrow 75 until its upper arm contacts with the cam surface at the end designated 76 and will then move from the windshield leaving a pile of snow 77 while it travels to a point opposite the end of the cam surface 44 when it will contact with the windshield again and move in the opposite direction along the surface of the windshield to a point at the end of its travel when it will move back again and repeat this operation. The other wiper which operates in conjunction with this blade will travel along the windshield in the direction of the arrow 75 until it is lifted therefrom by the cam surface designated 80 to step over the pile of snow 53 deposited by the first mentioned wiper and also over any accumulation of snow which has been picked up by its traveling along the surface of the windshield and will then contact with the windshield at the point opposite the end of the cam surface 80 to move the pile of snow 53 in the direction of the arrow 81 to the end of its travel to push the same off of the windshield or leave a small accumulation designated 82. In its return, the wiper is removed from the windshield by the cam surface 83 to contact again with the windshield at a point opposite the end of the cam surface to again travel its length as above described, and repeat its operation just described.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a window cleaning device, a carriage having a slot therein, means for guiding said carriage in a rectilinear path substantially parallel to the surface of the window to be wiped, a traveling belt provided with a pin extending in said slot for moving said carriage, a wiper arm hinged to said carriage for movement in a plane perpendicular to the window to be wiped, electrical means in the path of travel of said wiper and controlled by the carriage to move the wiper arm to swing the same relative to said carriage during a portion of the path of travel of said carriage in one direction.

2. In a window cleaning device, a wiper blade, means for mounting said blade for movement in a rectilinear path substantially parallel to the surface of the window to be wiped, said means including an arm to which said blade is secured, said arm being so mounted as to swing said blade away from the surface of the window, said blade being normally in contact with the surface of the window, means for reciprocating said arm and blade in said rectilinear path, movable means in the path of travel of said arm and between the ends thereof for temporarily engaging the arm and removing the blade from contact with the surface of the window while said blade is traveling, said arm moving said means out of its path of travel when receding from the end of its path.

3. In a window cleaning device, a carriage, means for reciprocating said carriage in a rectilinear path, a wiper blade for engaging the surface of the window, said wiper blade including an arm mounted on said carriage to move therewith and relative thereto, movable means located adjacent to but spaced from one end of and in the path of travel of said arm for engagement therewith to move said wiper away from contact with the surface of the window while said arm is traveling toward said end, said arm moving said means out of its path of travel when receding from said end.

4. In a window cleaning device, a carriage means for reciprocating said carriage in a rectilinear path substantially parallel to the surface of the window to be wiped, a wiper blade normally in contact with the surface of the window, said wiper blade having an arm mounted to swing on said carriage in a plane at an angle to the surface of the window, a cam located adjacent to but spaced from one end of and in the path of travel of said arm to temporarily swing said arm out of its normal path of travel while engaged by said cam thereby swinging said blade out of contact with the surface of the window while said carriage is traveling toward said end, said cam being constructed so as to permit free passage of the arm while receding from said end.

5. In a window cleaning device, a carriage having a slot therein, means for guiding said carriage in a rectilinear path substantially parallel to the surface of the window to be wiped, a traveling belt provided with a pin extending in said slot for moving said carriage, a wiper arm hinged to said carriage for movement in a plane at an angle to the window to be wiped, electrical means in the path of travel of said wiper, and controlled by the carriage to move the wiper arm to swing the same relative to said carriage during a portion of the travel of said carriage.

6. In a window cleaning device, a carriage means for reciprocating said carriage in a rectilinear path substantially parallel to the surface of the window to be wiped, a wiper blade normally in contact with the surface of the window, an arm secured to said wiper blade, and pivoted to said carriage to swing thereon in a plane at an angle to the surface of the window, a cam provided with a movable portion and positioned in the path of travel of said arm to temporarily engage one end of said arm and swing said arm out of its normal path of travel while engaged by said cam thereby swinging said blade out of contact with the surface of the window, said arm moving said movable portion out of its path of travel when receding from said end.

7. In a window cleaning device, a pair of spaced wiper blades in contact with the surface of the window, said wiper blades including arms thereon mounted for movement in a plane at an angle to the surface of the window, means for reciprocating said blades and arms in synchronous relation substantially parallel to the surface of the window, which paths of travel overlap each other at one end thereof, and means having a movable part positioned in and adjacent to the overlapping area of said path of travel for temporarily moving one of said wiper arms for removing one of said blades from contact with the surface of the window at this overlapping portion of travel, said arm moving said movable part out of its path of travel when receding from said overlapping end.

8. In a window cleaning device, a pair of traveling belts spaced lengthwise from each other and being substantially parallel to the surface of the window to be wiped, a carriage reciprocated by each of said belts, a pair of wiper blades normally in contact with the surface of the window, said wiper blades having arms movably mounted on the carriages, respectively, for movement in a plane at an angle to the surface of the window, one of said arms positioned on one of said carriages to cause the blade thereon to overlap in its travel the path of travel of the other blade and means positioned in the path of travel of a part of one of the blades and having a movable part for temporarily moving said overlapping blade away from the surface of the window at this overlapping portion of travel, said arm moving said movable part out of its path of travel when receding from said overlapping portion of travel.

9. In a window cleaning device, a carriage, means for guiding said carriage in a rectilinear path, a traveling belt for moving said carriage, a wiper arm hinged to said carriage, means in the path of travel of said wiper arm and between the ends thereof to swing the same relatively to said carriage during a portion of the travel of said carriage in one direction.

10. In a window cleaning device, a wiper blade, means for reciprocating said blade in a path of predetermined length parallel to the surface of the window to be wiped, resilient means urging said blade toward said surface to be wiped, means located to function between the ends of the path of travel of the blade for moving said blade against the action of said resilient means away from contact with said surface for a portion of its stroke during its travel in one direction only.

11. In a window cleaning device, a wiper blade, means for reciprocating said blade in a path of predetermined length parallel to the surface of the window to be wiped, resilient means urging said blade toward said surface to be wiped, cam means located to function between the ends of the path of travel of the blade for gradually moving said blade against the action of said resilient means away from contact with said surface for a portion of its stroke during its travel in one direction only, said cam being so shaped as to cause said blade by reason of said resilient means to snap back against said surface at or adjacent to the end of the stroke in said direction, said cam ceasing to function to move the blade away from the said surface during travel of the blade in the opposite direction, whereby the blade contacts with the portion of the surface which it skipped by reason of the action of said means for moving the blade from said surface.

12. In a a window cleaning device, a wiper blade, means for hinging said blade for movement in a plane perpendicular to the window to be wiped, means for reciprocating said blade in a path of travel of a predetermined length parallel to the surface of the window to be wiped, electrical means in the path of travel of parts moving with said wiper blade to move the wiper blade about said hinging means and away from said surface to be cleaned.

13. In a window cleaning device, a wiper blade including an arm, means for reciprocating said wiper blade and arm parallel to the surface to be wiped, said arm being mounted to be moved away from the surface to be wiped, means including a resiliently movable portion located adjacent to but spaced from one end of and in the path of travel of said arm for engagement therewith to move said wiper away from contact with the surface of the window while said arm is traveling toward said end, said arm moving the resiliently movable portion of said means out of its path of travel when receding from said end.

14. In a window cleaning device, a wiper blade including an arm, means for reciprocating said wiper blade and arm parallel to the surface to be wiped, said arm being mounted to be moved away from the surface to be wiped, a cam having a resilient portion located adjacent to but spaced from one end of and in the path of travel of said arm for engagement therewith to temporarily move said wiper away from contact with the surface of the window while said arm is traveling toward said end, said arm moving said resilient portion out of its path of travel when receding from said end.

15. In a window cleaning device, a wiper arm, a wiper blade carried thereby, means to reciprocate said arm to move the wiper blade parallel to the surface to be wiped, said arm being hinged to move at an angle to said surface, and means in the path of travel of said wiper arm and between the ends thereof to swing the same relative to said surface to be wiped during a portion of the travel of the reciprocation of the arm in one direction.

16. In a window cleaning device, a pair of spaced wiper blades in contact with the surface of the window, said wiper blades including arms thereon mounted for movement in a plane at an angle to the surface of the window, means for reciprocating said blades and arms in synchronous relation substantially parallel to the surface of the window, which paths of travel overlap each other at one end thereof, and means located to function between the ends of the path of travel of one of the blades and adjacent the overlapping area for temporarily moving one of said wiper blades from contact with the surface of the window at this overlapping portion of travel of said arm while moving in one direction.

WILLIAM B. SHAW.